United States Patent [19]
Klinger

[11] Patent Number: 6,053,126
[45] Date of Patent: Apr. 25, 2000

[54] COW BED

[75] Inventor: Martin Klinger, Burghausen, Germany

[73] Assignee: Gummiwerk Kraiburg Elastik GmbH, Germany

[21] Appl. No.: 09/040,055

[22] Filed: Mar. 17, 1998

[30] Foreign Application Priority Data

Jan. 13, 1998 [DE] Germany .......................... 198 00 945

[51] Int. Cl.$^7$ ................................................ A01K 1/015
[52] U.S. Cl. .......................................................... 119/526
[58] Field of Search .................................. 119/525, 526, 119/516, 28

[56] References Cited

U.S. PATENT DOCUMENTS

| 2,733,684 | 2/1956 | Trenchard | 119/525 |
| 3,699,926 | 10/1972 | Stockl | 119/525 |
| 4,211,185 | 7/1980 | Karlsson | 119/525 |
| 4,782,822 | 11/1988 | Ricken | 119/526 |
| 5,724,916 | 3/1998 | Brodie et al. | 119/525 |
| 5,819,688 | 10/1998 | Walker | 119/525 |

FOREIGN PATENT DOCUMENTS

| 2 320 623 | 11/1973 | Germany . |
| 24 35 055 | 2/1976 | Germany . |
| 80 12 389 | 8/1980 | Germany . |
| 0 117 707 | 9/1984 | Germany . |
| 295 06 734 U1 | 8/1995 | Germany . |
| 296 17 690 U1 | 2/1997 | Germany . |

*Primary Examiner*—Thomas Price
*Attorney, Agent, or Firm*—Baker Botts L.L.P.

[57] ABSTRACT

In a rubber-elastic floor mat for barns, in particular for use in single lair boxes, a downwardly directed web construction is provided along one of the side borders of the mat. This web construction is integral with the side border. The web construction defines underneath the mat a substantilly planar, continuous cavity which is open in downward direction and which can be filled with a layer of soft material.

34 Claims, 2 Drawing Sheets

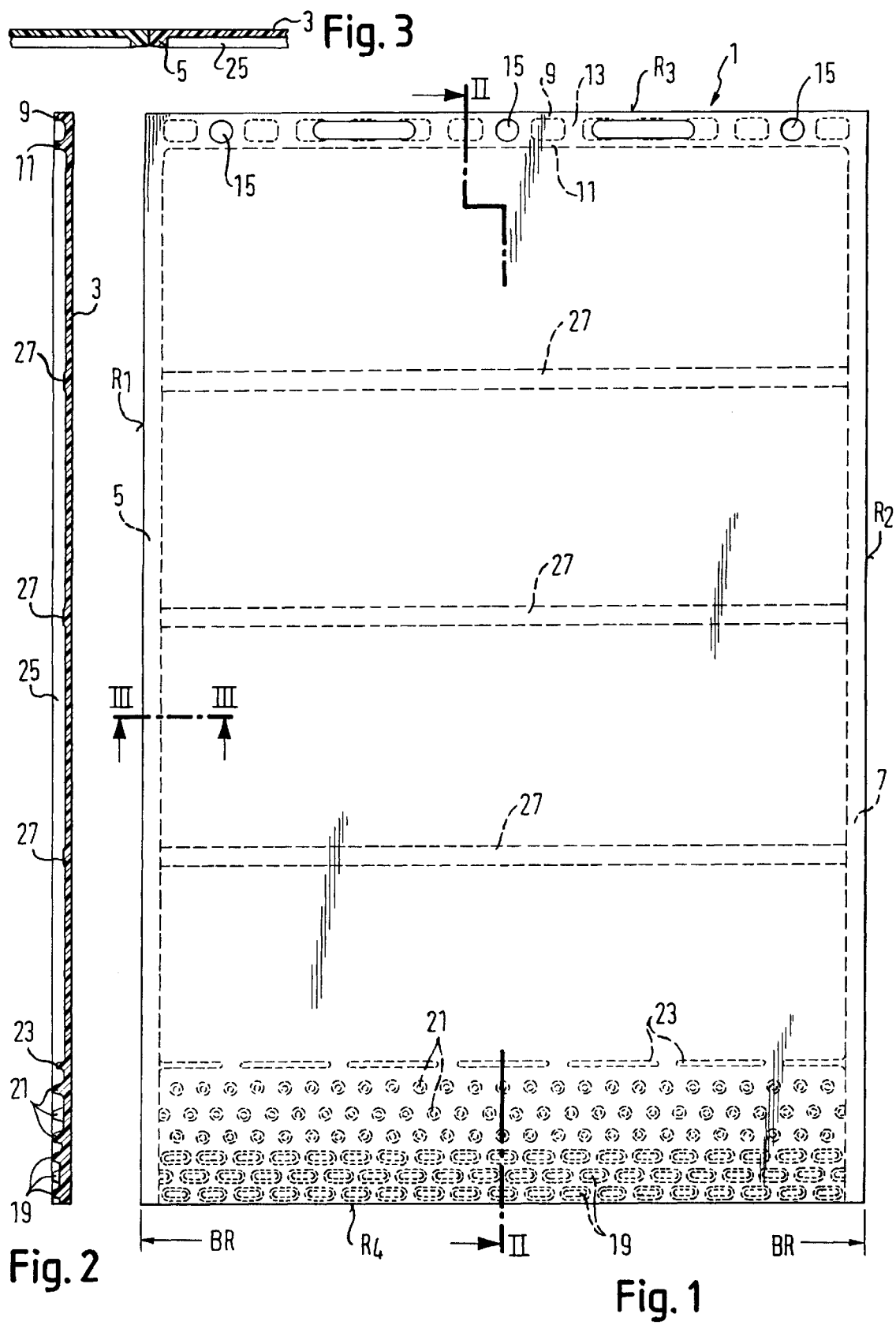

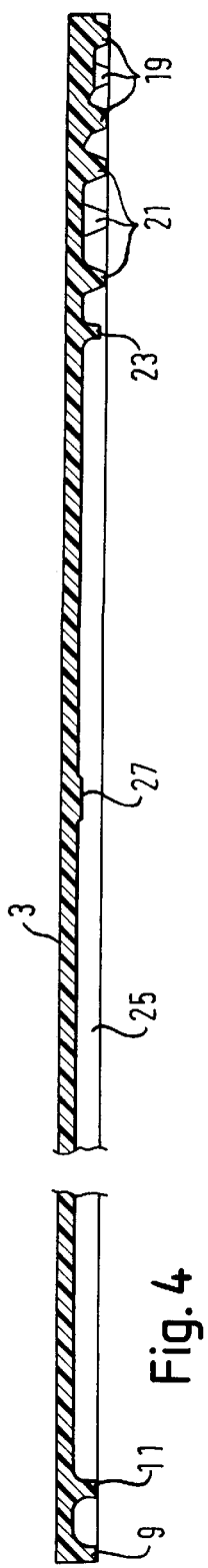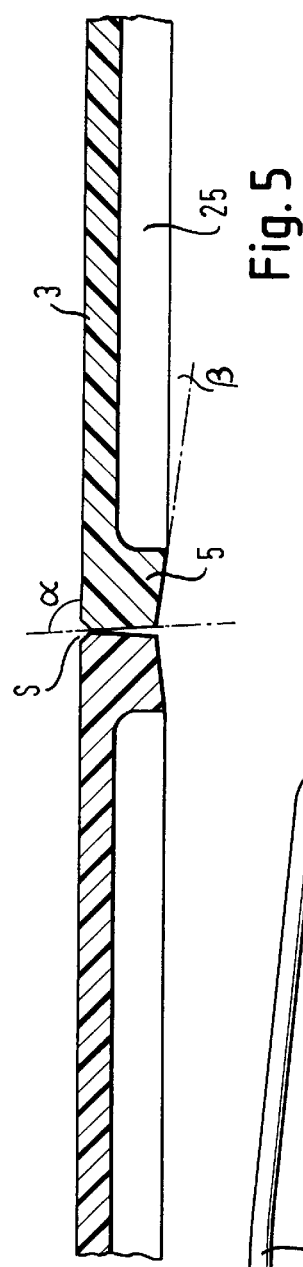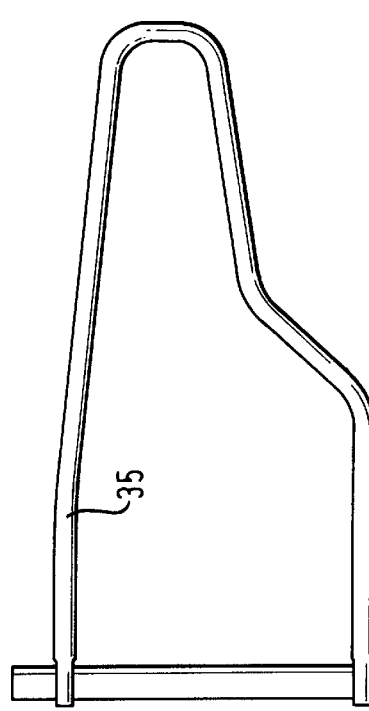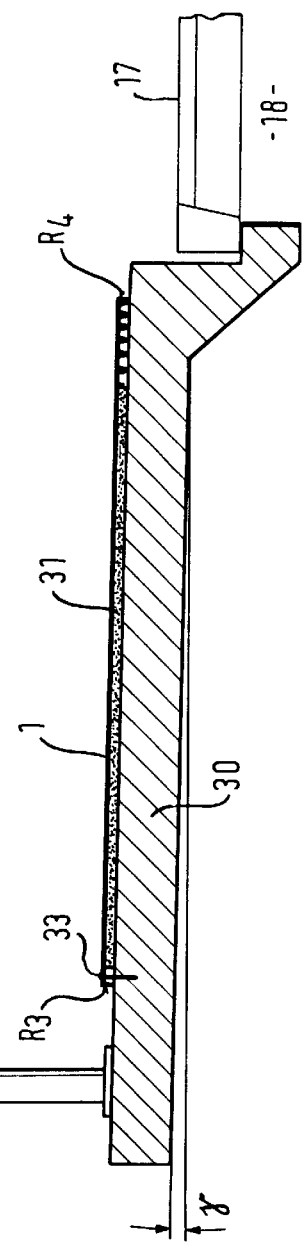

COW BED

BACKGROUND OF THE INVENTION

The present invention relates to a rubber-elastic floor mat for barns, in particular for use in cow bed boxes for strawless stabling where the cattle do not directly get into contact with straw.

STATEMENT OF THE PRIOR ART

The German application DE 295 06 734 U1 discloses such a rubber mat which comprises an upper, harder layer as floor stand to stand on as well as a lower, softer supporting layer of foam material. The mat is fastened to the barn floor by means of separate clamping strips which overlap the side walls of the mat lengthwise. The clamping strips have still another function: they serve as protective cover of the open side borders of the foam layer, e.g. against wetting. The laying and fastening of the clamping strips onto the barn floor entails great expenditure of work.

OBJECT OF THE INVENTION

Therefore, it is the object of the present invention to facilitate the laying and fastening of such floor mats.

SUMMARY OF THE INVENTION

For solving this problem, a downwardly directed web construction is integral with the floor mat of the present invention along at least one of the side borders of the mat. This web construction defines laterally a substantially planar, continuous, downwardly open cavity below the mat. The web constructions may also be fastened to the mat as separate parts, e.g. by riveting, sticking or vulcanizing.

The integral web constructions laterally seal the cavity thereunder which can be filled with soft materials, such as foam; this way, it can be avoided that e.g. water penetrates sidewards into the cavity and rottenness develops in the course of time. For the sealing of the side borders, no clamping strips are required which entail great mounting expenditure.

Preferably, the web construction comprises a plurality of web sub-constructions extending side by side along the at least one side border.

In order to allow the cattle to get easier onto the mat from the hard barn floor, the vertical compressive stability of the web sub-constructions may decrease permanently or gradually from the associated side border of the mat on.

Preferably, the web sub-constructions which are closer to the side border cover a larger face of the mat than the web sub-constructions which are remote from the side border.

The web construction may be a labyrinth packing, with the web sub-constructions being subdivided into a plurality of feet provided along a line in spaced relationship with respect to each other and being preferably staggered with respect to the feet of the neighboring row in longitudinal row direction. It is preferable that the staggered feet of neighboring rows overlap each other at least partly when regarded from the side border of the mat. Thus, an efficient sealing against spray water coming up during barn cleaning works is achieved; however, possibly entering seeping water can flow off between the feet and this way the cavity is ventilated. This type of web constructions is preferably provided only at the lower positioned border of the mat which rests on a barn floor having a pitch zone, i.e. approximately close to a slotted floor zone of the barn for the discharge of cattle excrements and cleaning water.

Especially on the remaining side borders of the mat, the web constructions can be designed as a continuous rib.

Preferably, the mat is rectangularly dimensioned to cover a cow bed for one piece of cattle, e.g. a dairy cow. A plurality of such mats may be arranged contiguous and jointless in one box row. In order to avoid that in case of vertical load onto the mat the adjacent ribs of neighboring mats diverge and dirt enters, the ribs are preferably undercut, when regarded from the tip, at the side thereof being remote from the cavity. If the cattle stand on the mat close to the side border, the rib thereunder can laterally make way towards the neighboring mat without the danger that a gap is formed on the mat surface.

Preferably, the floor mat comprises on all its side borders the web constructions in order to laterally and all-round frame the cavity defined therebelow. Such a mat can be laid independently from the existence of neighboring mats, whereby then the cavity is tightly sealed all-round.

In order to avoid that after longer time of use the mat expands in an irreversible manner and the side borders become rippled, the underface of the floor mat may carry reinforcing ribs extending between the web constructions of opposite side borders of the floor mat.

In order to keep the cavity below the mat continuous, the reinforcing rips may project from the underface of the floor mat less than the web construction.

It is sufficient that close to its border to be arranged in the upper portion of the barn floor pitch zone the floor mat comprises means for fastening it to the barn floor. Additional all-round provided fastening means, such as the aforementioned usual clamping strips, are not necessary as the sealing function is already taken over by the web constructions. A one-sided fastening of the mat allows free expansion of the mat towards the unfastened side of the mat without the danger that the mat becomes rippled.

Preferably, the floor mat is made in one piece by using waste rubber particles, preferably raw rubber material.

The cavity can be filled with soft material, e.g. with an open-pored foam material layer. The foam material layer can be laid loosely onto the barn floor as a separate plate and the mat is laid thereon, so that the web constructions preferably frame the foam material plate in all-round accurate fit and thus fix the plate in its position. As the foam material plate normally wears out faster than the rubber mat, the foam material plate can be exchanged without problems, e.g. also by straw. For this purpose, one will only have to lift the mat at the unfastened side and to exchange the foam material mat. The complete removal of the mat is not necessary if the mat is fastened to the floor possibly only along one side border.

The foam material plate can be wrapped partly or completely by a skin made from the foam material itself or by a separate foil. The foam material plate is preferably made from waste foam material flakes combined by the use of a bonding agent, such as poluyurethane adhesive.

In order to achieve full rest of the mat on the foam material plate while safeguarding tight sealing of the side walls, the foam material plate may be higher in its relaxed state than the amount by which the web constructions project from the underface of the floor mat.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be described in greater detail below by reference to the forms of embodiment as represented in the drawings, wherein:

FIG. 1 is a topview of a floor mat for use in cow beds;

FIG. 2 is a sectional view of a floor plate along line A—A in FIG. 1;

FIG. 3 is a sectional view through the longitudinal border of the floor mat along line B—B in FIG. 1 with an adjoining second floor mat;

FIG. 4 is a sectional view similar to FIG. 1 on an enlarged scale;

FIG. 5 is a sectional view similar to FIG. 3 on an enlarged scale; and

FIG. 6 is a longitudinal section through a cow bed with side limit yoke and floor mat laid.

DESCRIPTION OF A PREFERRED EMBODIMENT

A rubber floor mat 1 rectangular when seen in a topview comprises a cover plate 3 and web constructions which are integrally projecting in downward direction from the side borders $R_1$–$R_4$ of the mat.

The web constructions of the longitudinal borders $R_1$, $R_2$ of the rectangle are designed as uninterrupted ribs 5, 7 whose outer faces (as seen in FIG. 5) are, when seen from the top, obliquely undercut by an angle $\alpha$. The underfaces of the ribs 5, 7 are chamfered in outward and upward direction by an angle $\beta$.

At the one narrow side $R_3$ of the rectangle which is positioned at the upper side of the floor pitchy of the cow bed, i.e. at the head end, ribs 9, 11 extending in parallelism and in spaced relationship with respect to each other are provided which are combined by transverse webs 13 to form a grid. Three fastening holes 15 are distributed between the ribs 9, 11; these holes are receiving bolts to fix the mat to the barn floor.

At the other narrow side $R_4$ positioned at the lower tail end of the cow bed, i.e. close to the slotted floor 17 (diagrammatically shown in FIG. 6) for discharge of liquid manure into the discharge channel 18 extending therebelow, the web construction is made up by a plurality of feet 19, 21 separated from each other and being labyrinth-like arranged and staggered in longitudinal direction behind one another in several parallel rows. The feet 19 of the three rows close to the border are oval when seen in a topview, and the feet 21 of the three rows therebehind are circular when seen in a topview and have the same radius of curvature as the afore-mentioned oval feet 19. All feet 19 and 21 are conical in downward direction. The distance between the circular feet 21 is greater than the distance between the oval feet 19, so that it is more difficult to compress the mat as a whole in the zone close to the border than in the zone remote therefrom. Remote from the border of the innermost row of feet 21 there is extending a multiply interrupted rib 23 which does however not rest on the barn floor when the mat is in the unloaded state. The feet 19, 21 offer as a labyrinth packing protection against spray water from outside, allow however seeping water to flow out through the labyrinth channels left free between the feet 19, 21.

Corresponding discharge channels may also be provided in the barn floor itself.

The cover plate 1 and the ribs 5, 7, 11 as well as the feet 19, 21 form a flat case which defines a continuous cavity 25 open in downward direction.

Between the ribs 5, 7, flat, continuous reinforcing ribs 27 are extending which avoid an irreversible expansion of the mat over a longer time of use.

Before laying of the mat 1 onto the barn floor 30, a foam material mat 31 is laid (as shown in FIG. 6 by dots), and thereupon the rubber mat 1 is laid whose web constructions enclose the foam material plate in accurate fit. Thereupon, the rubber mat 1 is fastened to the higher end of the cow bed by means of bolts 33 inserted into the bolt holes 15.

In FIG. 6, a separating yoke for the lateral partition of a cow bed, in the present case for one single dairy cow, is designated by the reference numeral 35. The width BR—BR (FIG. 1) of the mat corresponds to the partition grid of the separating yoke 35 of a cow bed row, so that in the cow bed row the mats abut by their longitudinal borders $R_1$, $R_2$ against each other along a butt joint S, as shown in FIG. 5. The shape of the mat is adapted to the shape of a cow bed or corresponds to a small integral multiple thereof. The mats delivered in the form of plate stacks are—for each cow bed—typically dimensioned as follows: 1–2 m in width and 1.5–2.5 m in length, for dairy cows approx. 1.2 m in width and 1.8 m in length. The thickness of the floor mat is approximately 1–5 cm, in the present case approximately 3 cm including the ribs and the feet. Preferably, the mats are laid in such a manner that their longitudinal borders $R_1$, $R_2$ below the separating yokes 35 are in alignment therewith.

The rubber mat 1 is planarly closed, substantially free from perforations except for the fastening holes 15, and has a profilated non-skid upper side, channels being left free between the profile elevations so that liquids can flow off through these channels. The rubber mat is a comfortable, temperature-insulated bed or stand for the animal.

The rubber mat 1 of the present invention consists by approximately 90% of waste rubber particles bonded by means of hardenable material, such as epoxy or polyurethane resin, or thermoplastic material, such as polypropylene or polyethylene, or vulcanized by means of raw rubber containing vulcanizing aids, without additional fabric reinforcement having a Shore hardness of approximately 65. In the present case, the foam material plate 31 has been produced by the use of polyurethane foam, or a composite of waste foam material flakes combined by means of polyurethane adhesive; different foam material hardness degrees are achieved in dependency from the amount of pressure applied. The foam material plate may be enclosed partly or completely by a skin formed from its own material or by a separate foil.

Specific forms of embodiment of the invention have been represented and described in order to illustrate the use of the principles of the invention. Of course, the invention can also be realized in other ways without departing from these principles.

The reference numerals in the claims serve only for facilitation of understanding and are not to be understood as a limitation.

What is claimed is:

1. A rubber-elastic floor covering in operational position on a floor of a barn, said floor covering comprising at least one rubber-elastic covering plate member, said covering plate member having a central area portion and a circumferential edge zone portion extending between said central area portion and a circumferential edge line of said covering plate member, said covering plate member having an upper face substantially throughout said central area portion and said circumferential edge zone portion, said covering plate member having a lower face in said central area portion, said lower face and said upper face defining the wall thickness of said central area portion, said covering plate member being, before being positioned on said floor, pre-fabricated in said circumferential edge zone portion with a downward projecting web arrangement projecting in a downward direction beyond said lower face of said central area portion and providing engagement face means for supporting engagement with said floor, the vertical distance between said engagement face means and said upper face being larger than said wall thickness of said central area portion, said lower face of said central area portion and said web arrangement confining a downward open cavity extending throughout said central area portion, said cavity accommodating and laterally securing a soft layer separate from said covering plate member, said covering plate member having a size substantially corresponding to a space requirement of an animal.

2. The floor covering as set forth in claim 1, wherein a vertical pressure stability of the web arrangement decreases in a direction proceeding from a respective edge line section of said circumferential edge line toward said central area portion continuously or stepwise.

3. The floor covering as set forth in claim 1, wherein said circumferential edge line has a substantially rectangular shape, said web arrangement being provided with interruptions at least along one side line of said rectangular circumferential edge line.

4. The floor covering as set forth in claim 3, an interrupted section of said web arrangement being provided by at least one series of foot members.

5. The floor covering as set forth in claim 4, said foot members of mutually adjacent series of foot members being staggered with respect to each other along a direction of the respective series.

6. The floor covering as set forth in claim 4, mutually subsequent series of foot members following each other when proceeding from a respective edge line section toward the central area portion providing a decreasing contribution for pressure stability.

7. The floor covering as set forth in claim 3, at least one first series of foot members, which series is near and parallel to a respective side line section of said circumferential edge line comprising foot members elongate along said series, at least one further series of foot members, which series is more remote from and parallel to said respective side line section of said circumferential edge line having foot members of a substantially circular cross-sectional area and at least one still further series of foot members, which series is most remote from and parallel to said respective side line section of said circumferential edge line having foot members elongate along said series.

8. The floor covering as set forth in claim 1, wherein said circumferential edge line has a substantially rectangular shape, said web arrangement being shaped as a substantially continuous rib at least along one side line of said circumferential edge line.

9. The floor covering as set forth in claim 1, said web arrangement being fastened to said floor only along a part of said circumferential edge line.

10. The floor covering as set forth in claim 1, wherein said floor has an inclination (y), said web arrangement being fastened to said floor only along a higher part of said circumferential edge line.

11. The floor covering as set forth in claim 1, said floor having an inclination (y), said circumferential edge line having a rectangular shape, said web arrangement being fastened to said floor along a higher side line of said circumferential edge line, said web arrangement having along two inclined side lines continuous ribs, said web arrangement being shaped with interruptions along a lower side line.

12. The floor covering as set forth in claim 1, said covering plate member having a section of said circumferential edge line, which section is adjacent and in parallel to an analogous section of a further covering plate member, each of said covering plate members being shaped along said respective sections as ribs having an abutment face opposite to a respective abutment face of the respective other covering plate member, said abutment faces being inclined by a small angle with respect to respective vertical reference planes and extending downward toward the respective central area portion and each of said ribs further having a support face inclined by a small angle ($\beta$) with respect to a horizontal reference plane such as to run with a downward inclination toward the central area portion of the respective covering plate member.

13. The floor covering as set forth in claim 1, said covering plate member being provided at the lower face of its central area portion with at least one tensional reinforcement member.

14. The floor covering as set forth in claim 13, said tensional reinforcement member being integral with the central area portion of the respective covering plate member and being substantially in parallel with respect to an edge line section of said circumferential edge line.

15. The floor covering as set forth in claim 14, said tensional reinforcement member being substantially in parallel with respect to an edge line section of said circumferential edge line which edge line section follows a line of substantially constant height on an inclined floor.

16. The floor covering as set forth in claim 13, said tensional reinforcement member having a smaller downward projection measure with respect to the lower face of said central area portion as compared with the downward projection measure of said web arrangement with respect to said lower face.

17. The floor covering as set forth in claim 1, said web arrangement having a fastening section with pre-fabricated hole formations for accommodating fastening means.

18. The floor covering as set forth in claim 1, comprising a plurality of covering plate members arranged in mutually abutting relationship along a series of animal standing positions.

19. The floor covering as set forth in claim 18, said covering plate members of said plurality being arranged along a plurality of animal standing positions, said animal standing positions being separated from each other by separating units, said separating units being located in vertical planes defined by abutment lines between subsequent covering plate members.

20. The floor covering as set forth in claim 1, said covering plate member being manufactured in using recycling rubber particles.

21. The floor covering as set forth in claim 1, said soft layer comprising foam material.

22. The floor covering as set forth in claim 21, said soft layer comprising foam material particles bonded to each other.

23. The floor covering as set forth in claim 21, said foam material being an open-pore foam material.

24. The floor covering as set forth in claim 21, said foam material being partially or fully enclosed by skin means.

25. The floor covering as set forth in claim 21, said soft layer being fittingly enclosed by said web arrangement.

26. The floor covering as set forth in claim 1, said soft layer having in a relaxed condition a thickness which is larger than the height of said cavity.

27. The floor covering as set forth in claim 1, said covering plate member being a plate adapted for stacking.

28. The floor covering as set forth in claim 1, said covering plate member having a substantially plane upper face.

29. The floor covering as set forth in claim 1, said soft layer having substantially plane lower and upper faces which are in parallel with respect to each other.

30. The floor covering as set forth in claim 1, said web arrangement being integral with said central area portion of said covering plate member.

31. A method of providing or repairing a rubber-elastic floor coating as set forth in claim 1, said method comprising spreading said soft layer on said floor and thereupon placing said covering plate member over said soft layer such that said web arrangement surrounds said soft layer.

32. A method as set forth in claim 31, further comprising fastening said covering plate member to said floor.

33. A method as set forth in claim 31, comprising lifting said covering plate member outside of a fastening line along which it is fastened to said floor and exchanging said soft layer.

34. A covering plate member for preparing a rubber-elastic floor coating as set forth in claim 1, said covering plate member having a circumferential edge line and being provided with a downward projecting web arrangement along said circumferential edge line, said web arrangement confining a downwardly open cavity in cooperation with a lower face of said covering member, said cavity being adapted for accommodating a soft layer.

* * * * *

UNITED STATES PATENT AND TRADEMARK OFFICE
CERTIFICATE OF CORRECTION

PATENT NO. : 6,053,126
DATED : April 25, 2000
INVENTOR(S) : Martin Klinger

It is certified that error appears in the above-identified patent and that said Letters Patent is hereby corrected as shown below:

Title page,
Item [57], ABSTRACT, line 5, "substantilly" should read -- substantially --

Claims,
Column 5,
Lines 7 and 14, "downward" should read -- downwardly --

Column 6,
Lines 9 and 29, "in parallel" should read -- parallel --
Line 32, "in" should be deleted
Line 58, "cling" should read -- cled --

Column 7,
Line 9, "plane" should read -- planar --

Column 2,
Line 26, "rips" should read -- ribs --
Line 56, "poluyurethane" should read -- polyurethane --

Column 3,
Lines 9, 24, 50, and 52, "topview" should read -- top view --
Line 25, "pitchy" should read -- pitch $\gamma$ --

Signed and Sealed this

Twenty-third Day of October, 2001

Attest:

NICHOLAS P. GODICI

*Attesting Officer*  *Acting Director of the United States Patent and Trademark Office*